(12) United States Patent
Lompech et al.

(10) Patent No.: US 8,413,310 B2
(45) Date of Patent: Apr. 9, 2013

(54) METHOD OF ASSEMBLING PUSHBUTTONS BY POSITIONING THE BODIES IN THE CONVEYING PATH

(75) Inventors: Herve Lompech, Bouttencourt (FR); Jean-Luc Marcel Octau, Intraville (FR); Philippe Chretien, Eu (FR); Jean-Luc Herbette, Belloy sur Somme (FR)

(73) Assignee: Rexam Dispensing Systems S.A.S. (FR)

( * ) Notice: Subject to any disclaimer, the term of this patent is extended or adjusted under 35 U.S.C. 154(b) by 1170 days.

(21) Appl. No.: 12/277,738

(22) Filed: Nov. 25, 2008

(65) Prior Publication Data

US 2009/0145722 A1 Jun. 11, 2009

(30) Foreign Application Priority Data

Nov. 30, 2007 (FR) ...................................... 07 08409

(51) Int. Cl.
 *B21D 39/03* (2006.01)
(52) U.S. Cl.
 USPC .......................................................... 29/430
(58) Field of Classification Search .............. 29/428, 29/430
 See application file for complete search history.

(56) References Cited

U.S. PATENT DOCUMENTS

| 3,024,523 A | 3/1962 | Donaldson |
| 3,258,106 A | 6/1966 | Booth |
| 3,523,316 A | 8/1970 | Alexander |
| 3,708,854 A | 1/1973 | Nalbach |
| 4,049,389 A | 9/1977 | Grinberg et al. |
| 4,177,548 A | 12/1979 | Yarick et al. |
| 5,036,569 A | 8/1991 | Linnecke |
| 5,191,960 A | 3/1993 | Wareham |

FOREIGN PATENT DOCUMENTS

GB 1259969 A 1/1972

OTHER PUBLICATIONS

French Search Report, Sep. 12, 2008, 5 pages.

*Primary Examiner* — David Bryant
*Assistant Examiner* — Moshe Wilensky
(74) *Attorney, Agent, or Firm* — St. Onge Steward Johnston & Reens LLC

(57) ABSTRACT

A method of assembling pushbuttons for a liquid dispensing system, in which each pushbutton comprises an actuation body and at least one other component assembled with said body in a given position, said method making provision for using bodies on which a positioning cavity is formed, and continuously supplying a station for assembling the bodies and the other components by means of a path for conveying said bodies, said path having a complementary profile intended to cooperate with the cavities in order to carry out the positioning of said bodies in said conveying path, so as to carry out the assembly of the other components on the bodies thus positioned during their conveying to the assembly station. The invention also concerns an installation for implementing this method, and a pushbutton assembled by implementing said method.

5 Claims, 2 Drawing Sheets

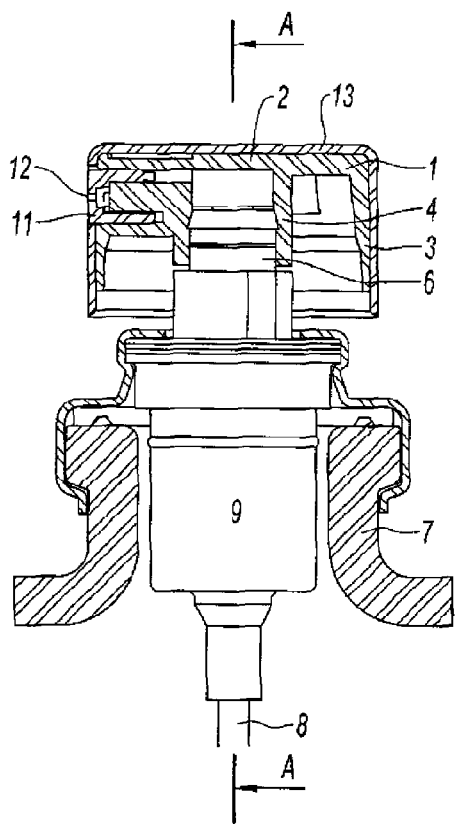
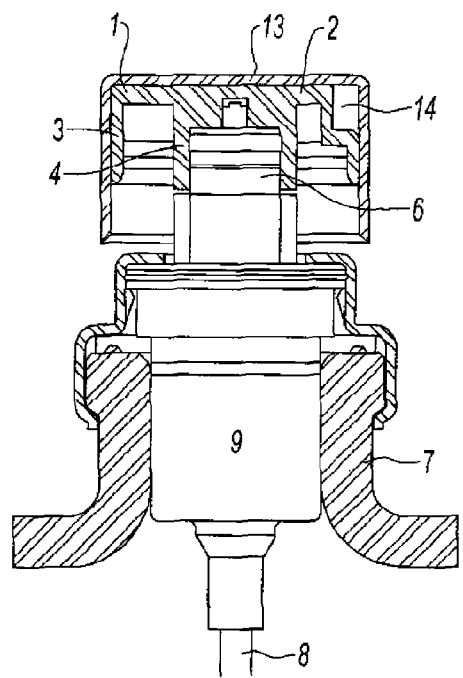
Fig. 1
Fig. 2
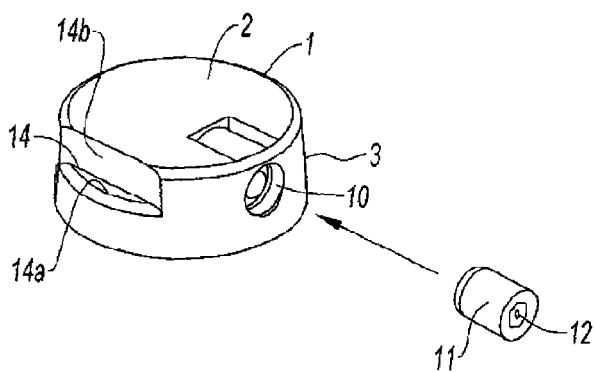
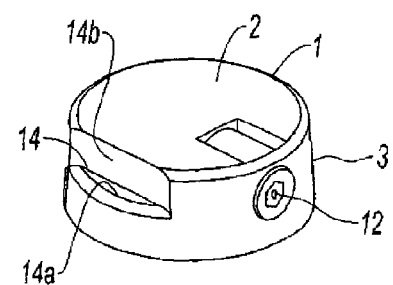
Fig. 3a
Fig. 3b

METHOD OF ASSEMBLING PUSHBUTTONS BY POSITIONING THE BODIES IN THE CONVEYING PATH

CROSS-REFERENCE TO RELATED APPLICATIONS

The present application claims priority of French patent application No. 07 08409 filed on Nov. 30, 2007, the content of which is incorporated herein by reference.

FIELD OF THE INVENTION

The invention concerns a method of assembling pushbuttons for a liquid dispensing system, an installation for implementing this method, and a pushbutton assembled by implementing said method.

BACKGROUND OF THE INVENTION

In a particular application, the dispensing system is intended to equip bottles used in perfumery, in cosmetics or for pharmaceutical treatments. This is because this type of bottle contains a liquid which is retrieved by a dispensing system comprising a manually actuated valve or pump, said system being actuated by a pushbutton in order to allow spraying of the liquid.

Such pushbuttons are conventionally made in two or three parts: an actuation body, a nozzle for spraying the liquid and possibly a cover covering said body, said parts being assembled together to form the pushbutton. After assembly, the pushbuttons are installed on the dispensing systems by fitting onto a jet acting as an output duct for the contents of the bottles.

In order to carry out the assembly of the nozzle and if applicable the cover onto the body, said body should be positioned accurately with respect to the assembly tools. In particular, the nozzle is conventionally intended to be fitted into a housing in the body, and the orientation of said housing with respect to the circumference of the nozzle must therefore be certain in order to be able to automatically push said nozzle into said housing.

With the assembly methods according to the prior art, the positioning of the bodies is carried out individually, in particular by inserting in said body a counter-form of its internal profile. Next, the nozzle is pushed into the housing and, if applicable, the cover is associated on top of said body, leaving the output aperture of the nozzle clear. Assembly can also be carried out in the reverse order. However, this type of method requires that the conveying be stopped in order to position the body, which limits the output rates to approximately two assemblies per second.

The aim of the invention is to improve the prior art by proposing in particular a method of assembling pushbuttons in which the assembly rates can be increased, in particular up to five pushbuttons per second.

SUMMARY OF THE INVENTION

To that end, and according to a first aspect, the invention proposes a method of assembling pushbuttons for a liquid dispensing system, in which each pushbutton comprises an actuation body and at least one other component assembled with said body in a given position, said method making provision for using bodies on which a positioning cavity is formed, and continuously supplying a station for assembling the bodies and the other elements by means of a path for conveying said bodies, said path having a complementary profile intended to cooperate with the cavities in order to carry out the positioning of said bodies in said conveying path, so as to carry out the assembly of the other components on the bodies thus positioned during their conveying to the assembly station.

According to a second aspect, the invention proposes an installation for implementing such an assembly method, said installation comprising a stock of bodies, an assembly station and a conveying path between said stock and said station, in which the conveying path has a complementary profile which is intended to cooperate with the cavities in order to carry out the positioning of said bodies in said path during their conveying to the assembly station.

According to a third aspect, the invention proposes a pushbutton assembled by implementing such a method, said pushbutton comprising a body provided with a positioning cavity, said pushbutton also comprising a nozzle and/or a cover assembled on said body.

BRIEF DESCRIPTION OF THE DRAWINGS

Other objects and advantages of the invention will emerge from the following description, produced with reference to the accompanying figures in which:

FIG. 1 is a longitudinal sectional view of a pushbutton according to one embodiment of the invention, said pushbutton being mounted on a pump equipping a bottle;

FIG. 2 is a longitudinal sectional view along the line AA of FIG. 1;

FIG. 3 are perspective views of the pushbutton according to FIG. 1, respectively before assembly of the nozzle (FIG. 3a) and after said assembly (FIG. 3b);

DETAILED DESCRIPTION OF THE INVENTION

Figure 4:
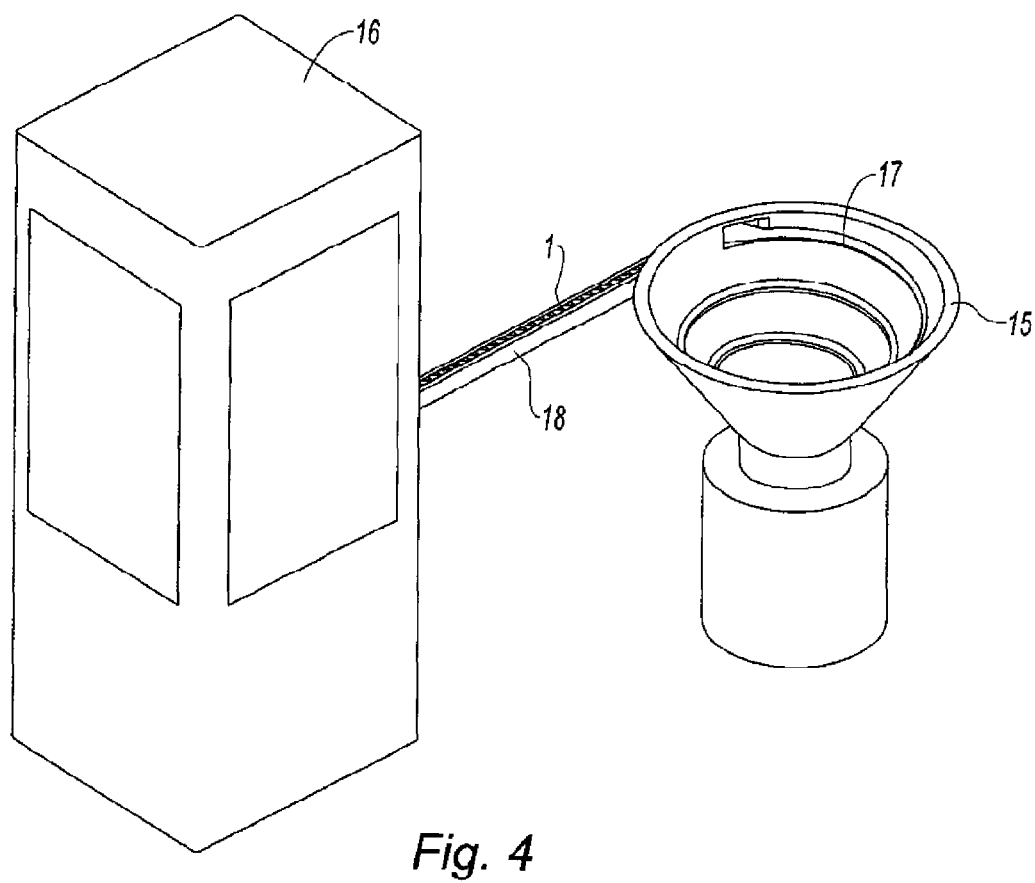
FIG. 4 is a schematic depiction of an installation for assembling pushbuttons according to FIG. 1.

In connection with FIGS. 1 to 3, a spray pushbutton for a liquid dispensing system is described below, it being possible for said liquid to be of any kind, in particular used in perfumery, in cosmetics or for pharmaceutical treatments.

The pushbutton comprises an actuation body 1 in which a dispensing path is formed. The body 1 has an upper wall 2 allowing the user to exert finger pressure thereon in order to be able to move said pushbutton axially. The body 1 also has, made in a single piece, an outer side wall 3 and an inner side wall 4, said side walls extending under the upper wall 2 with said inner side wall surrounded by said outer side wall. The inner side wall 4 delimits a housing 5 for mounting the pushbutton on the dispensing system, said housing being in communication with the dispensing path.

In the figures, the dispensing system has a jet 6 which is inserted in a sealed manner in the housing 5. In a known manner, the dispensing system furthermore comprises means for mounting on the neck 7 of a bottle containing the liquid and means 8 for drawing liquid from inside said bottle which are arranged to supply the jet 6 with liquid under pressure.

To do this, the dispensing system comprises a manually actuated pump 9 or, in the case where the liquid is packed under pressure in the bottle, a manually actuated valve. Thus, during manual movement of the pushbutton, the pump 9 or the valve is actuated in order to supply the jet 6 with liquid under pressure.

The body 1 also has an annular housing 10 with axis perpendicular to that of the mounting housing 5, the downstream end of the dispensing path opening into said housing.

The pushbutton also comprises a spray nozzle 11 which is assembled with said body 1 by being mounted in the housing 10 (FIG. 3). In the embodiments depicted, the nozzle 11 comprises a cylindrical body in which a dispensing aperture 12 is formed, said nozzle being disposed collinearly with the axis of the housing 10 in order to allow lateral spraying of the liquid relative to the body 1 of the pushbutton.

Furthermore, the pushbutton comprises a finishing cover 13 which is mounted on the actuation body 1, covering the upper wall 2 and the external face of the outer side wall 3 while leaving the dispensing aperture 12 clear.

In connection with FIGS. 4 and 5, a description is given below of an installation and a method for assembling such pushbuttons comprising an actuation body 1, a spray nozzle 11 and a cover 13. In a variant, the pushbutton can comprise a single one of these components assembled with the body 1, or more generally at least one component to be assembled with said body in a given position.

The method makes provision for using actuation bodies 1 on which a positioning cavity is formed. In the figures, the cavity is formed by a notch 14 provided on the upper wall 2 of the body 1, said notch opening onto said wall. More precisely, the notch 14 has a flat radial surface 14a connected to a flat axial surface 14b, said surfaces being formed in the outer side wall 3 for example during moulding of the body 1.

Moreover, in the embodiment depicted, the notch 14 extends parallel to the axis of the housing 10 for mounting the nozzle 11. In a variant, the notch 14 can be formed in order to extend perpendicular to this axis or in any other position. These implementations allow simple indexing of the housing 10 of the nozzle 11 with respect to the tools for enabling said nozzle to be pushed into said housing.

In FIG. 4, the pushbutton assembly installation comprises a stock of bodies which is formed by a vibrating bowl 15, said bowl being depicted empty in the figure. The installation also comprises an assembly station 16 and a path for conveying the bodies 1 between said bowl and said station. The method thus makes provision for continuously supplying the pushbutton assembly station 16 by means of said conveying path, in particular by disposing the bodies 1 in said path by vibration of the bowl 15.

In order to allow the positioning of the bodies 1 by means of the notches 14, the conveying path has a complementary profile which is intended to cooperate with said notches. Thus, the positioning of the bodies 1 is carried out in the conveying path so as to be able to carry out the assembly of the other components on the bodies 1 which were positioned during their conveying to the assembly station 16.

In particular, the assembly method therefore does not require the conveying of the bodies 1 to be stopped for their positioning, this being carried out in the conveying path, which makes it possible to increase in particular the assembly rates. Then, assembly can be carried out in the assembly station 16, in particular the pushing of the nozzle 11 into the housing 10 followed by fitting of the cover 13 on the body 1, said cover moreover concealing the positioning notch 14.

In the embodiment described, the cooperation is achieved by engagement of the notch 14 in a rail extending along the conveying path. In particular, the rail is implemented in a fixed manner in the conveying path so as not to use movable members for carrying out the positioning.

Figures 5A, 5B:
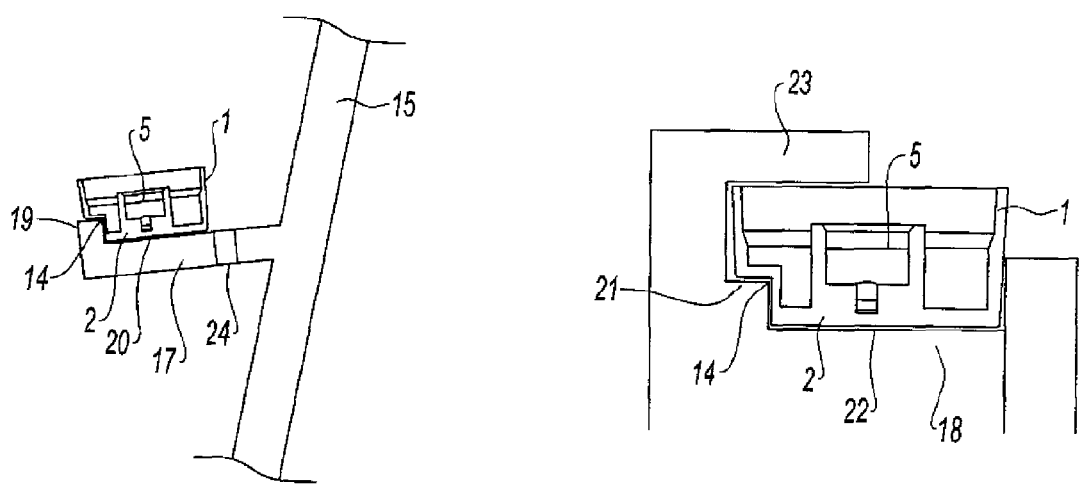
FIG. 5 are partial cross-sectional views of respectively the ramp (FIG. 5a) and the chute (FIG. 5b) of the installation according to FIG. 4, a positioned pushbutton being depicted in these figures.

In connection with FIGS. 4 and 5, the internal periphery of the vibrating bowl 15 comprises a conveying ramp 17 which is formed in a helix, the upper end of said ramp communicating with a chute 18 to form the conveying path. More precisely, the ramp 17 has an outer edge 19 projecting with respect to its bottom 20, said edge having dimensions adapted to form the complementary profile in which the notches 14 can engage. In particular, the height of the edge 19 corresponds substantially to that of the notch 14 so as to be able to dispose the body 1 in the ramp 17 with the upper wall 3 facing the bottom 20 and the notch 14 resting on the edge 19 (FIG. 5a).

Furthermore, a lateral step 21 is formed along the chute 18, said step having dimensions similar to that of the edge 19 so as to form a complementary profile in line with said edge. In this implementation, the complementary profile therefore consists of a rail for positioning and guiding the bodies 1 in the conveying path. Moreover, the bottom 22 of the chute 18 has a width similar to the size of the upper wall 2 which is disposed facing when the notch 14 is engaged in the step 21 (FIG. 5b). Furthermore, the chute 18 comprises a roof 23 disposed above the step 21 with a height arranged to keep the notches 14 in said step during conveying of the bodies 1 in said chute.

Thus, the bodies 1 contained in the bowl 15 are disposed on the ramp 17 by vibration. Next, the vibrations facilitate the orientation of the body 1 into the correct position depicted in FIG. 5a. Still under the effect of the vibrations, the bodies 1 move one behind another in the ramp 17 in order to reach the chute 18 in the correct position, said position then being maintained during the conveying in said chute to the assembly station 16.

The assembly method also makes provision for expelling from the conveying path the bodies 1 that are in an incorrect position, in particular by applying a force on a part of the body 1 that projects from the conveying path when said body is in an incorrect position. In particular, the expulsion can be carried out on the ramp 17, that is to say prior to the input of the chute 18.

To do this, the bottom 20 has an aperture 24 which is positioned at a distance from the edge 19 which is, on the one hand, less than the diameter of the bodies 1 and, on the other hand, greater than the size of said body when the notch 14 is engaged in said edge. The aperture 24 is in communication with a means of applying a force, in particular an air jet (not depicted), which makes it possible, in the case where the notch 14 is not engaged on the edge 19, to raise said body since part thereof comes opposite the aperture 24. Moreover, the ramp 17 is inclined towards the inside of the bowl 15 in order to facilitate the expulsion by tilting of the raised body 1, and allow the return of said body into said bowl for its subsequent conveying.

What is claimed is:

1. A method of assembling pushbuttons for a liquid dispensing system, in which each pushbutton includes an actuation body and a component assembled with said actuation body in a given position, the method comprising:
   forming a positioning cavity in the actuation body;
   continuously conveying a plurality of the actuation bodies along a path to an assembly station, the path having a complementary profile intended to cooperate with the positioning cavities;
   orienting the actuation bodies on the path by having the positioning cavity of each actuation body engage with the complementary profile of the path, wherein the engagement between the positioning cavity of each actuation body and the complementary profile of the path prevents angular rotation of each actuation body on the path; and assembling the component to the oriented actuation body.

2. The assembly method according to claim 1, wherein the positioning cavity is a notch; and wherein the orientation step comprises engagement of the notch with a rail extending along the conveying path.

3. The assembly method according to claim 1, characterised in that the bodies are disposed in the conveying path by vibration.

4. The assembly method according to claim 1, further comprising the step of expelling from the conveying path the bodies that are incorrectly positioned.

5. The assembly method according to claim 4, characterised in that the expulsion is carried out by application of a force on a part of the body that projects from the conveying path when said body is in an incorrect position.

* * * * *